(12) United States Patent
Sajassi et al.

(10) Patent No.: US 10,824,509 B2
(45) Date of Patent: *Nov. 3, 2020

(54) FAST CONVERGENCE FOR FAILURES OF LARGE SCALE VIRTUAL ETHERNET SEGMENTS IN EVPN AND PBB-EVPN

(71) Applicant: Cisco Technology, Inc., San Jose, CA (US)

(72) Inventors: Ali Sajassi, San Ramon, CA (US); Jose A. Liste, Sunnyvale, CA (US); Patrice Brissette, Gatineau (CA); Mei Zhang, Raleigh, NC (US); Vi Vu, Dallas, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,953

(22) Filed: Sep. 11, 2019

(65) Prior Publication Data

US 2020/0004635 A1 Jan. 2, 2020

Related U.S. Application Data

(63) Continuation of application No. 15/795,871, filed on Oct. 27, 2017, now Pat. No. 10,417,095, which is a (Continued)

(51) Int. Cl.
| H04W 72/04 | (2009.01) |
| G06F 11/14 | (2006.01) |
| H04L 12/707 | (2013.01) |
| H04L 12/741 | (2013.01) |
| H04L 12/703 | (2013.01) |

(52) U.S. Cl.
CPC .......... G06F 11/1423 (2013.01); H04L 45/22 (2013.01); H04L 45/28 (2013.01); H04L 45/745 (2013.01)

(58) Field of Classification Search
None
See application file for complete search history.

(56) References Cited

U.S. PATENT DOCUMENTS

| 6,421,711 B1 | 7/2002 | Blumenau et al. |
| 9,858,150 B2 * | 1/2018 | Sajassi ............... H04L 45/745 |

(Continued)

*Primary Examiner* — Mohammad S Adhami
(74) *Attorney, Agent, or Firm* — Polsinelli PC

(57) ABSTRACT

Systems, methods, and computer-readable media for fast convergence for virtual ethernet segments in EVPN and PBB-EVPN networks are disclosed. A first provider edge (PE) device can receive one or more advertising messages corresponding to one or more virtual ethernet segments, wherein each of the one or more advertising messages can include a port identifier. The first PE device maintains a table including the one or more virtual ethernet segments and the corresponding port identifier. The first PE device can receive a failure message from a second PE device that identifies a first port on the second PE device, and identifies, based on the table, at least one affected virtual ethernet segment that is associated with the first port. The first PE device can remove any routes that are associated with the at least one affected virtual ethernet segment and trigger mass designated-forwarding election for impacted virtual ethernet segments.

20 Claims, 6 Drawing Sheets

Related U.S. Application Data continuation of application No. 14/750,311, filed on Jun. 25, 2015, now Pat. No. 9,858,150.

(56) References Cited

U.S. PATENT DOCUMENTS

| | | |
|---|---|---|
| 10,417,095 B2* | 9/2019 | Sajassi .................... H04L 45/22 |
| 2006/0245435 A1 | 11/2006 | Sajassi |
| 2009/0296568 A1 | 12/2009 | Kitada |
| 2012/0020206 A1 | 1/2012 | Busi et al. |
| 2016/0261487 A1 | 9/2016 | Singh et al. |
| 2016/0277210 A1 | 9/2016 | Lin et al. |

* cited by examiner

| vES IDENTIFIER | COLOR | NEXT HOP |
|---|---|---|
| A | BLUE | PE1 |
| A | RED | PE3 |
| B | BLUE | PE1 |
| C | YELLOW | PE3 |
| D | YELLOW | PE3 |
| ... | ... | ... |
| ZZ | BLUE | PE1 |

ROUTE TABLE
400

FAST CONVERGENCE FOR FAILURES OF LARGE SCALE VIRTUAL ETHERNET SEGMENTS IN EVPN AND PBB-EVPN

CROSS REFERENCE TO RELATED APPLICATIONS

The instant application is a Continuation of, and claims priority to, U.S. patent application Ser. No. 15/795,871, entitled FAST CONVERGENCE FOR FAILURES OF LARGE SCALE VIRTUAL ETHERNET SEGMENTS IN EVPN AND PBB-EVPN, filed Oct. 27, 2017, which is a Continuation of U.S. Pat. No. 9,858,150, entitled FAST CONVERGENCE FOR FAILURES OF LARGE SCALE VIRTUAL ETHERNET SEGMENTS IN EVPN AND PBB-EVPN, filed Jun. 25, 2015, the contents of which are expressly incorporated by reference herein in their entireties.

TECHNICAL FIELD

The present technology generally pertains to network based services, and more specifically, to enabling provider edge nodes to perform fast convergence upon detection of a failure that affects virtual ethernet segments.

BACKGROUND

Service provider networks frequently provide multiple connections to a single customer network or customer edge device in order to provide redundancy in the event of a network failure. Unfortunately, a single port failure (e.g. a Network-to-Network Interface (NNI)) on a Provider Edge device can affect thousands of associated Virtual Ethernet Segments and their corresponding Customer Edge device. Consequently, the time necessary to activate the redundancy mechanisms for each of the affected segments can be significant and result in service interruption. Accordingly, the benefits of redundancy can be significantly limited in modern service provider networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example table for use in performing fast convergence in EVPN and PBB-EVPN;

DESCRIPTION OF EXAMPLE EMBODIMENTS

Figure 1:
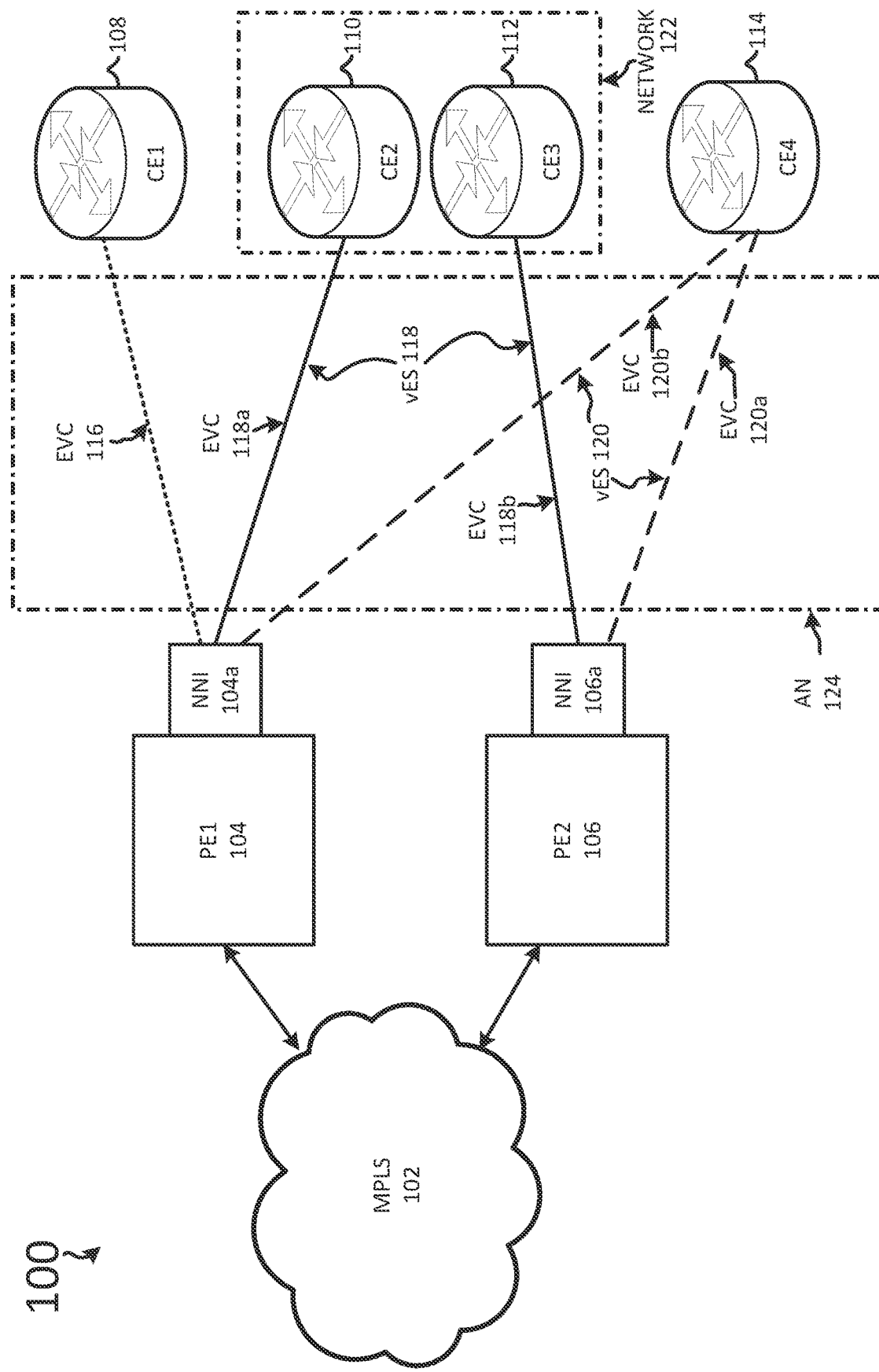
FIG. 1 illustrates a schematic block diagram of an example service provider network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The subject technology provides embodiments for fast convergence for failures of large scale virtual ethernet segments in EPVN and PBB-EVPN. The method includes receiving, at a PE device from a neighboring PE device, one or more routing advertising messages corresponding to one or more virtual ethernet segments. The one or more messages can include a port identifier that identifies the port associated with the virtual ethernet segment on the neighboring PE device. The PE device maintains a table or a list that includes the one or more virtual ethernet segments along with their corresponding port identifier. The PE device receives a message from a neighboring PE device that identifies a port on the neighboring PE device that has failed. Using the message, the receiving PE device can sort its local table and identify the affected virtual ethernet segments that are associated with the failed port. In response, the receiving PE device can invalidate any locally stored virtual ethernet segment routes that are associated with the failed port. The PE device can also initiate a new designated forwarder election process for each of the affected virtual ethernet segments.

DETAILED DESCRIPTION

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

A service provider network can provide service to customer networks via Provider Edge (PE) devices (e.g. routers or switches) that are located at the edge of the service provider network. Each PE device may be connected directly to a Customer Edge (CE) device (e.g. host, router or switch) located at the edge of a customer network. In other cases, an Access Network (AN) provides connectivity (via Ethernet Virtual Circuits (EVC)) in order to interconnect PE and CE devices. In some instances, the AN can be an Ethernet Access Network (EAN) that can support EVCs by utilizing 802.1Q encapsulations. Alternatively, the AN can be a IP or a MPLS network that can support EVCs by utilizing Ethernet over IP encapsulation or Ethernet over MPLS encapsulation, respectively. The PE devices in a service provider network may be connected by a Multi-Protocol Label Switching (MPLS) infrastructure that provides benefits such as fast-reroute and resiliency. The PE devices may also be connected by an IP infrastructure that utilizes Generic Routing Encapsulation (GRE) tunneling or other IP tunneling between the PE devices.

An Ethernet Virtual Private Network (EVPN) is a layer 2 virtual private network (VPN) technology built over a Packet Switched Network (PSN) (e.g. utilizing an MPLS/IP infrastructure). An EVPN instance includes CE devices that are connected to PE devices that form the edge of the MPLS infrastructure. An EVPN instance can include one or more broadcast domains (e.g. one or more VLANs) that are assigned to a given EVPN instance by the provider of the EVPN service. The PE devices provide virtual layer 2 bridged connectivity between the CE devices. A service provider network can include multiple EVPN instances. EVPN provides advanced multi-homing capabilities and uses Border Gateway Protocol (BGP) to distribute customer MAC address information over the core MPLS network.

Ethernet Provider Backbone Bridging (PBB) can be combined with EVPN to create a PBB-EVPN. In PBB-EVPN, MAC-in-MAC tunneling is employed to improve service instance and MAC address scalability in Ethernet networks. PBB-EVPN reduces the number of BGP MAC advertisement routes by aggregating Customer/Client MAC (C-MAC) address via Provider Backbone MAC address (B-MAC).

EVPN and PBB-EVPN can each provide a service provider network with solutions for multipoint Ethernet services utilizing MPLS/IP networks and advanced multi-homing capabilities. For example, EVPN and PBB-EVPN can each support single-homed devices, single-homed networks, multi-homed devices and multi-homed networks. A customer multi-homed device or a customer multi-homed network can tolerate certain network failures because the connection to two or more PE devices provides additional redundancy. In all-active redundancy mode, all of the PEs attached to a customer multi-homed device/network are allowed to forward traffic to/from that customer device or customer network. In single-active redundancy mode, only a single PE (the designated forwarder), among a group of PEs attached to a customer multi-homed device/network, is allowed to forward traffic to/from the customer device or customer network. In the event a failure occurs at the PE device that is the designated forwarder, a new designated forwarder can be elected in order to maintain network connectivity.

In the case where a CE device/network is multi-homed to two or more PE devices, the set of Ethernet links between the CE device and the PE devices constitutes an Ethernet Segment (ES). In instances when an AN is used, a port (physical or logical (e.g. bundle)) on a PE device acts as a Network-to-Network Interface (NNI). In this context, NNIs are used to aggregate and interconnect customers to a PE device by utilizing access Ethernet Virtual Circuits (EVCs). An External NNI (ENNI) is used when the AN is built and operated by a third-party Service Provider. An Ethernet Segment that consists of EVCs instead of physical links is referred to as a Virtual Ethernet Segment (vES).

The use of virtual Ethernet Segments can significantly expand the capability of a single PE device. In the case of an ES, the PE is limited to having a single CE device connected to each of its ports, i.e. there is a one-to-one relationship between a CE device and a physical/logical port (e.g. a bundle such as a 2×10GE bundle) on the PE. In the case of a vES, the PE device can be configured to provide service to thousands of customers over a common NNI that terminates access EVCs interconnecting thousands of CE devices.

Figure 2:
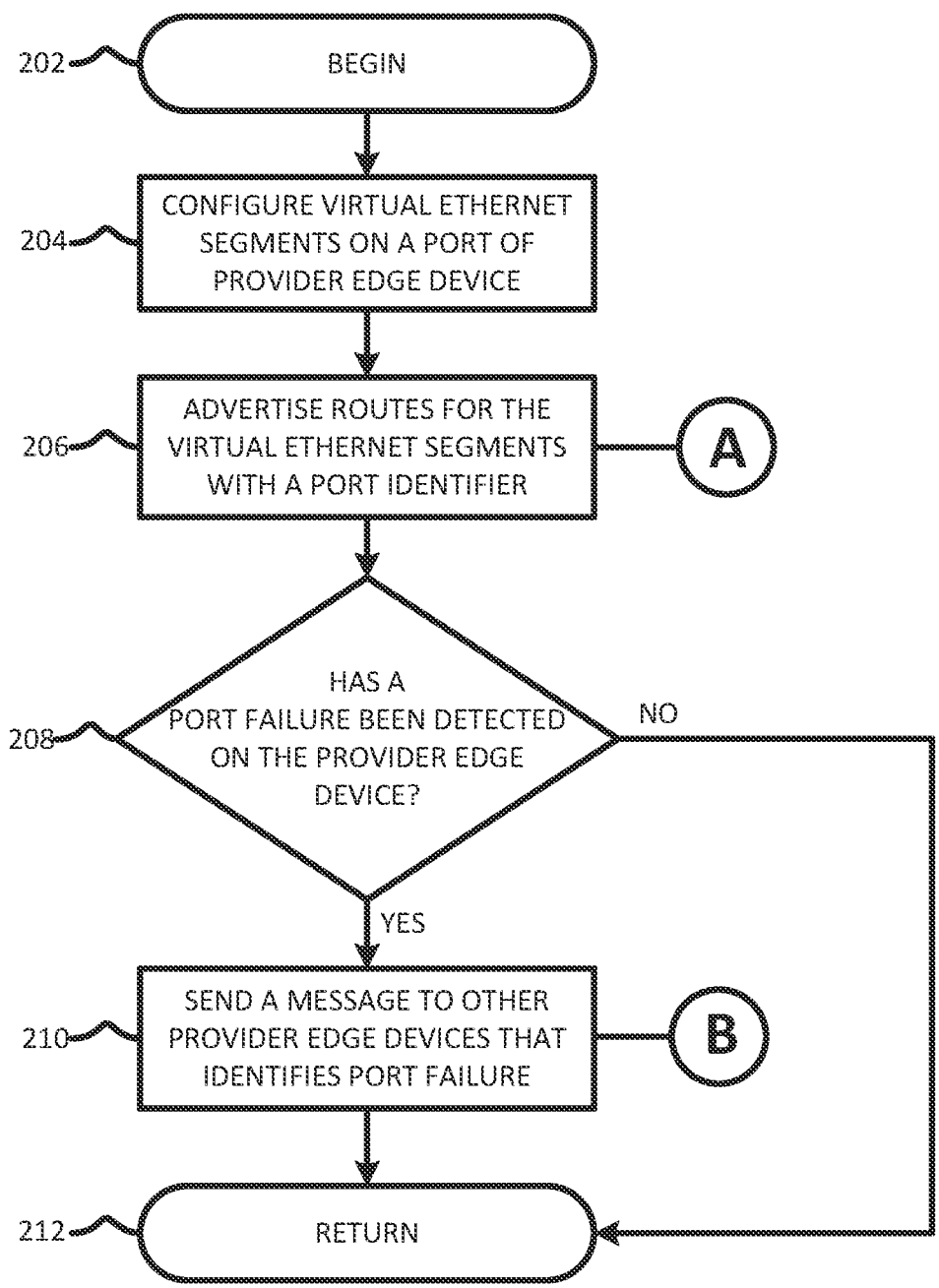
FIG. 2 illustrates an example method for performing fast convergence upon detecting a Provider Edge port failure.
Figure 3:
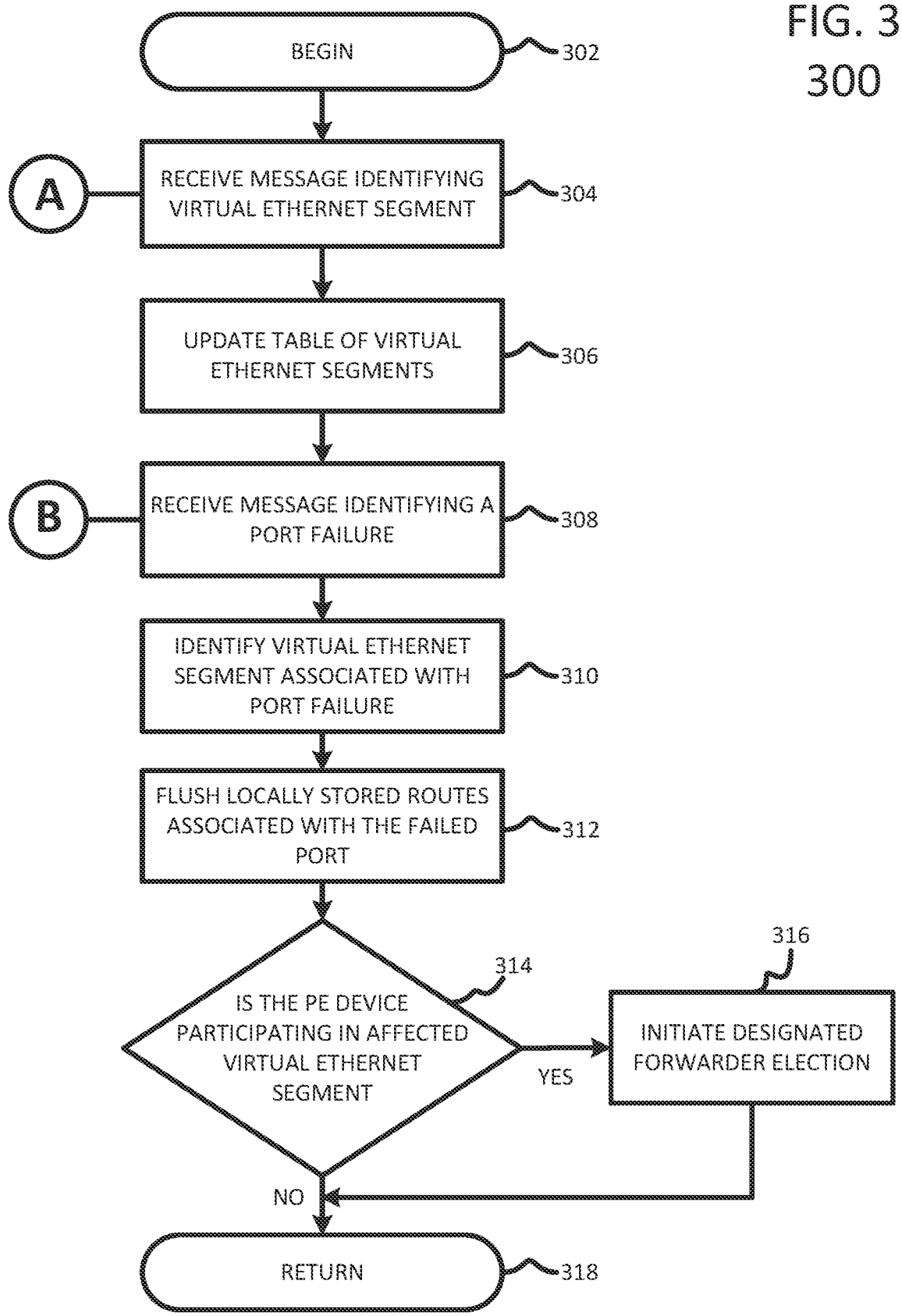
FIG. 3 illustrates a second example method for performing fast convergence upon detecting a Provider Edge port failure.
Figure 5:
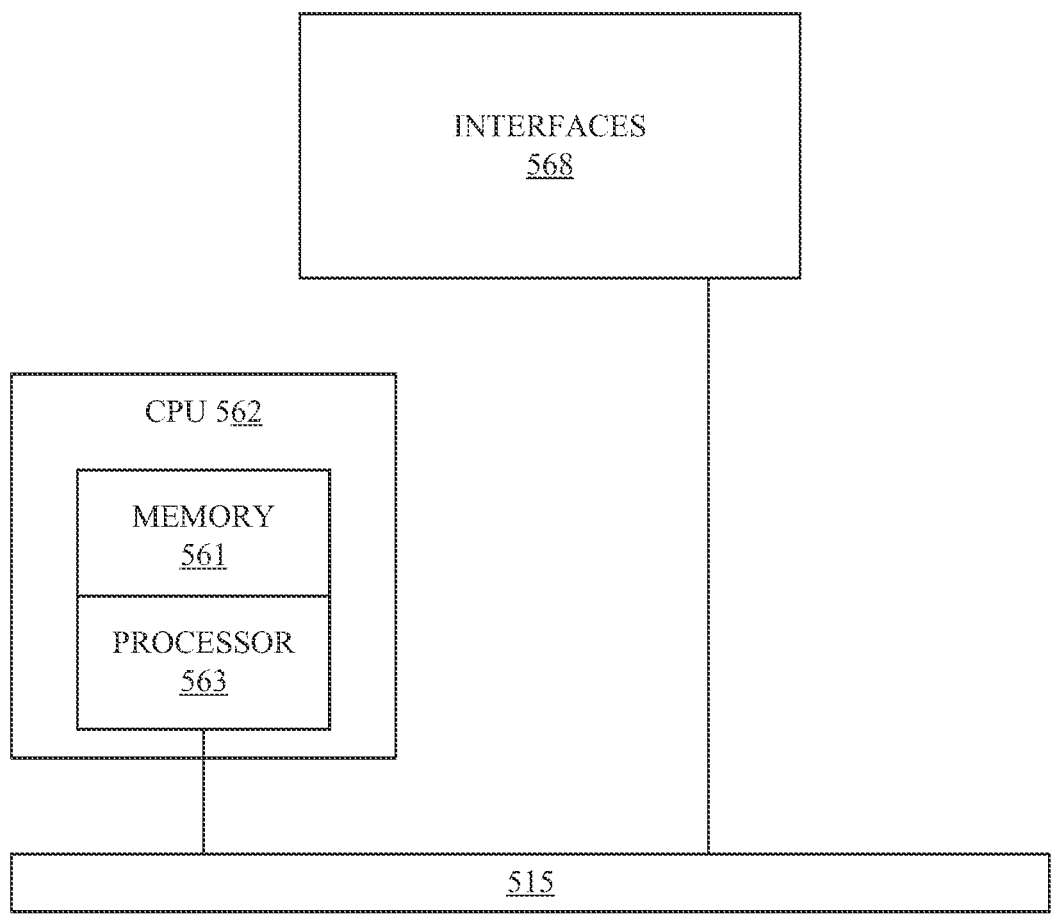
FIG. 5 illustrates an example network device.
Figure 6A:
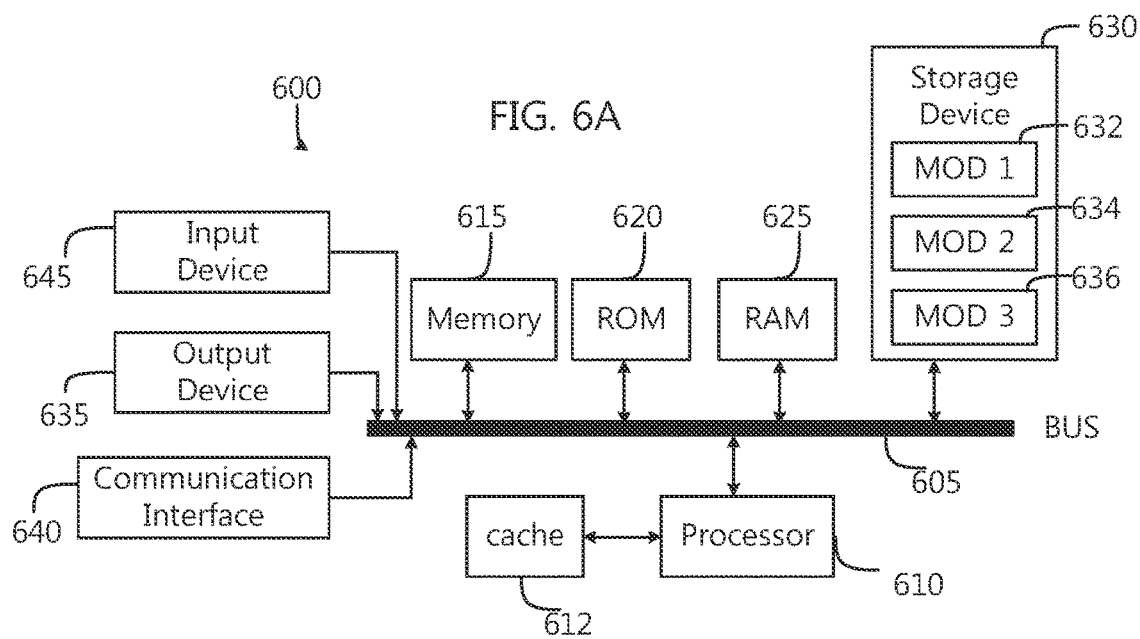
FIGS. 6A and 6B illustrate example system embodiments.
Figure 6B:
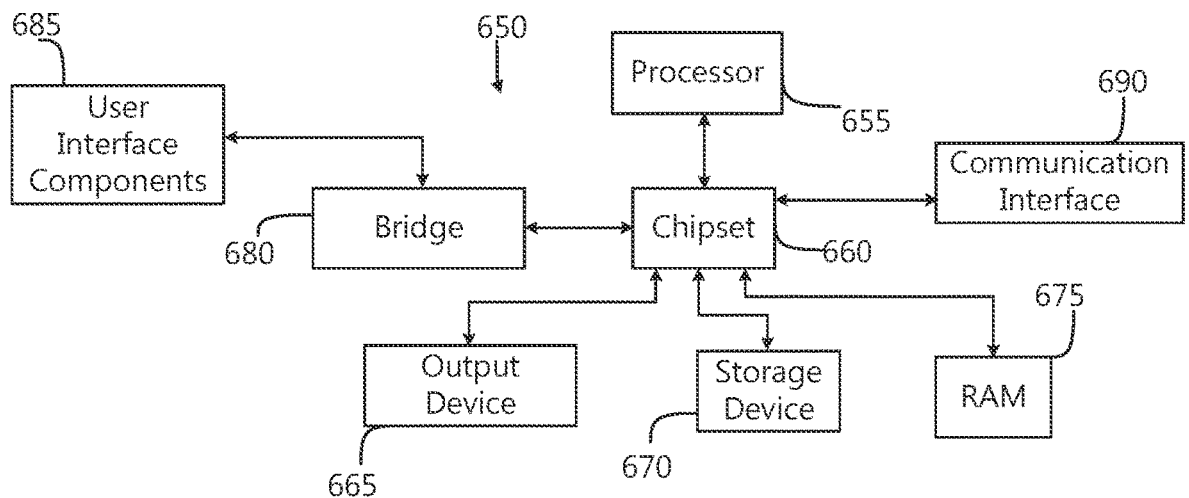

The disclosed technology addresses the need in the art for fast convergence for failures of large scale virtual ethernet segments in EVPN and PBB-EVPN networks. Disclosed are systems, methods, and computer-readable storage media for providing fast convergence in the event an NNI/ENNI failure is detected at a PE device. A description of a service provider network, as illustrated in FIG. 1, is first disclosed herein. A discussion of fast convergence for failure of large scale vES in EVPN and PBB-EVPN will then follow, including examples and variations as illustrated in FIGS. 2-4. The discussion concludes with a brief description of example devices, as illustrated in FIGS. 5 and 6A-B. These variations shall be described herein as the various embodiments are set forth. The disclosure now turns to FIG. 1.

FIG. 1 illustrates a schematic block diagram of an example service provider network 100 including nodes/devices interconnected by various methods of communication. The service provider network 100 can include any number of provider edge (PE) devices such as PE1 104 and PE2 106. The PE devices PE1 104 and PE2 106 can communicate with each other over a Multi-Protocol Label Switching (MPLS) network 102. The service provider network 100 can also include any number of Customer Edge (CE) devices such as CE1 108, CE2 110, CE3 112 and CE4 114. A CE device may be a host, a router, or a switch. The PEs can provide virtual Layer 2 bridged connectivity between the CEs.

Service provider network 100 can also include an Access Network (AN) 124 that can provide connectivity between PE devices and CE devices. AN 124 can be an Ethernet Access Network (EAN), a MPLS network, or an IP network. In some instances, PE devices 104/106 and AN 124 can be built and/or operated by a single service provider. Alternatively, PE devices 104/106 and AN 124 can be built and/or operated by separate entities or by separate divisions associated with a service provider. Those skilled in the art will recognize that AN 124 can include additional network components that are not shown in FIG. 1.

Each PE device in the service provider network 100 can have one or more ports that can be used to provide network connectivity to the CE devices via AN 124. A port on a PE device can be a physical port such as a 10GE interface or logical port such as a 2×10GE bundle. For example, PE1 104 can have one or more physical or logical ports such as Network-to-Network Interface (NNI) 104a. Likewise, PE2 106 can have one or more physical or logical ports such as Network-to-Network Interface (NNI) 106a. Each NNI can be associated with one or more Ethernet Virtual Circuits (EVCs) such as EVC 116, EVC 118a, EVC 118b, EVC 120a, and EVC 120b that are used by AN 124 to provide connectivity between PE and CE devices. When AN 124 is operated by a third-party service provider, the ports on PE1 104 and PE2 106 can correspond to an External NNI (ENNI).

A Virtual Ethernet Segment (vES) can include multiple EVCs. EVC 118a and EVC 118b together can make up vES 118. Similarly, EVC 120a and EVC 120b together can make up vES 120. By utilizing EVCs, a single NNI port on a PE device can be configured to connect to multiple CE devices. For example, NNI 104a can connect to CE1 108, CE2 110, and CE4 114 through EVC 116, EVC 118a, and EVC 120b, respectively. Similarly, NNI 106a can connect to CE3 112 through EVC 118b and to CE4 114 through EVC 120a. Those skilled in the art will recognize that the number of devices shown and the specific configuration is for the purpose of illustration only and is not intended to limit the scope of the present technology. In some embodiments, a switch can be used to aggregate multiple EVCs into a single physical port on a PE device. For example, EVCs 116, 118a, and 120b can each be coupled to a network switch (not shown) that is connected to NNI 104a. The configuration shown in service provider network 100 is for illustrative purposes and does not limit the present technology. Configurations that include additional and/or different components and connections are contemplated herein.

Service provider network 100 can provide multipoint Ethernet service by utilizing EVPN or PBB-EVPN. EVPN and PBB-EVPN PEs can signal and learn MAC addresses of their corresponding CEs using Border Gateway Protocol. This can enable the PEs to learn what CEs or networks are single-homed or multi-homed.

When a CE is multi-homed, i.e. it is connected to more than one PE, there are two redundancy modes of operation. In all-active redundancy mode, all of the PEs attached to a particular vES are allowed to forward traffic to/from that vES. In single-active redundancy mode, only a single PE (the designated forwarder), among a group of PEs attached to a vES, is allowed to forward traffic to/from the vES.

Turning back to service provider network 100, it can include both single-homed and multi-homed CE devices and networks. For example, CE1 108 is connected to PE1 104 through EVC 116. As illustrated, CE1 108 is not connected to any other PE devices. Thus, CE1 108 can be classified as a single-homed device. That is, if a failure occurs on PE1 104 that causes NNI 104a to fail, then CE1 108 would be left without network connectivity because it does not have any other connections to provide redundancy.

Alternatively, CE4 114 is a multi-homed device because it is connected to PE1 104 through EVC 120b and also to PE2 106 through EVC 120a. Accordingly, PE1 104 and PE2 106 can function together in either all-active redundancy mode or in single-active redundancy mode with respect to CE4 114. As mentioned above, each PE in a service provider network can advertise the MAC addresses and/or routes associated with each of its ports. Thus, PE1 104 can advertise that vES 120 is associated with its NNI 104a. Likewise, PE2 can advertise that vES 120 is associated with its NNI 106a.

Service provider network 100 can also include multiple CE devices that are part of a single customer network, such as network 122. A single customer location may increase its redundancy by maintaining CE2 110 and CE3 112 which are each connected to different PE devices, PE1 104 and PE2 106, respectively. Network 122 is thus a multi-homed network. A multi-homed network can receive the same redundancy benefits as a multi-homed device—e.g. the PE devices can operate in single-active redundancy or in all-active redundancy.

In the event a failure occurs at a PE device that is associated with a multi-homed CE device, the system must converge efficiently to minimize network down-time and avoid lost data packets. For example, PE1 104 and PE2 106 can operate in single-active redundancy mode with respect to CE4 114 with PE1 104 as the designated forward. If a port failure occurs at PE1 104, it must alert PE2 106 (as well as any other PEs in the network) of the failure such that PE2 106 can commence routing network traffic to CE4 114 as soon as possible. However, because NNI 104a can be associated with thousands of Virtual Ethernet Segments, PE1 104 must utilize an efficient method to alert all other PEs simultaneously rather than on a per route or per vES basis.

FIG. 2 illustrates an example method 200 for performing fast convergence upon detecting a Provider Edge port failure in EVPN and PBB-EVPN. The method 200 begins at step 202 and proceeds to step 204 where a PE device configures a Virtual Ethernet Segment, such as vES 118 or vES 120 discussed with respect to FIG. 1. As noted above, a single port (NNI or ENNI) on a PE device can support thousands of Virtual Ethernet Segments. Therefore, this step can be repeated as necessary in order to configure all Virtual Ethernet Segments on each NNI of the PE device.

The method 200 proceeds to step 206 where the PE device advertises each of the routes for the configured Virtual Ethernet Segments. In doing so, the PE can color, label, identify, map, or tag the route for the vES with a port identifier. As used herein, the term color refers to the inclusion of additional information in the route advertising message that identifies the NNI or ENNI port that is associated with the route. In one embodiment, the PE can append or otherwise include the Media Access Control (MAC) address of the port that is associated with the vES. For example, if the MAC address for NNI 104a on PE 1 104 is AA-BB-CC-DD-EE-FF, then this address could be included with the advertising message for each of the vES routes on that port. That is, upon advertising vES 116, vES 118, and vES 120, PE1 104 would include the MAC address in each of the advertising messages. The PE device could continue to do so for each vES configures on each of its ports. Note that the MAC address is simply one example of an identifier for the NNI port. Those that are skilled in the art will recognize that other identifiers can be used as alternatives. The MAC address is used here as a non-limiting example for explanation purposes. Also note that the advertising message transmitted in step 206 is designated with an "A" because it corresponds to the message that is received in step 304 of method 300, discussed more fully below with respect to FIG. 3.

After the routes are advertised to the other PEs in the service provider network, the method continues to step 208 where the PE device monitors for any port failures. A port failure can include a failure of a physical port or of a logical port. A port can correspond to an NNI or an ENNI on a PE device, as described with respect to FIG. 1. In some embodiments, a port failure can be detected by monitoring light levels for a transmit fault or a receive fault. If no port failure is detected, the method proceeds to step 212 where the PE returns to previous processing, which includes repeating method 200. Alternatively, if the PE detects that a particular port, e.g. an NNI or an ENNI, has failed, then the method proceeds to step 210.

At step 210, the PE can send a message to neighboring PE devices in the service provider network that identifies the port failure. For example, the message can instruct other PEs to invalidate any routes that they have stored which are associated with the failed port. The port failure message can identify the port in the same manner as it was identified in the previously disseminated route advertisements. That is, one manner to identify the port failure is to utilize the MAC address of the failed port.

In the case of EVPN, the port failure message can be a special mass-withdraw with the MAC address of the failed port encoded in the Ethernet Segment Identifier (ESI) field. In one embodiment, an Ethernet Auto-Discovery (A-D) BGP route with a type 3 ESI can be used with the MAC field set to the MAC address of the port and the 3-octet local discriminator field set to 0xFFFFFF. The mass-withdraw route can signal remote PEs to access a locally stored list of Virtual Ethernet Segments and initiate the mass-withdraw procedure for each vES associated with the particular MAC address.

In the case of PBB-EVPN, the port failure message can be a BGP route withdrawal corresponding to the MAC address of the failed port. In one embodiment, when the MAC address of the NNI/ENNI port is used as BMAC source address, a withdrawal of the MAC advertisement BGP route for the NNI/ENNI's MAC can be used. In another, when a shared MAC is used as BMAC SA for all single-active vESs, then a re-advertisement of a BGP MAC route (for the shared BMAC) along with the field used to signal NNI/ENNI's color and along with MAC Mobility extended community can be used. Note that the port failure message discussed with respect to step 210 is designated with a "B" and corresponds to the message that is received at step 308 of method 300, discussed more fully below with respect to FIG. 3.

After the port failure message is sent at 210, the method continues to step 212 where it returns to previous processing, which includes repeating method 200.

FIG. 3 illustrates a second example method 300 for performing fast convergence upon detecting a Provider Edge port failure in EVPN and PBB-EVPN. The method 300 begins at step 302 and proceeds to step 304 where a PE device receives a message advertising routes for Virtual Ethernet Segments. The message can be received by a remote PE in the service provider network from a PE that is executing method 200 discussed above. The message can include a route to a vES and it can be colored, labeled, tagged, identified, or associated with a particular identifier. In one embodiment, the color can correspond to the MAC address of the NNI or the ENNI port on the PE device that is advertising the route.

After receiving the message at 304, the method continues to 306 where the PE device can update its local table/list of Virtual Ethernet Segments. FIG. 4 illustrates an example route table 400 that can be utilized to maintain the vES routes and their associated colors. Route table 400 can include an entry that corresponds to each received vES route advertisement. For each advertised vES, the table can include a vES identifier, a color associated with the vES identifier, and a next hop field that identifies the PE device that advertised the vES and its color. For example, the top row indicates that vES 'A' was colored as 'Blue' at remote PE1. In addition, entries were made for route advertisements corresponding to vES 'B' and vES 'ZZ' which are each also associated with color 'Blue.' Therefore, the table illustrates that each of vES 'A,' vES 'B,' and vES 'ZZ' are associated with the same NNI on PE1 because they each have the same color. Likewise, vES 'C' and vES 'D' also share an NNI because they are both colored with 'Yellow' by remote PE3. Note that vES 'A' is also associated with color 'Red' as advertised by PE3, which means that vES 'A' is multi-homed to the port that corresponds to 'Blue' on PE1 and to the port that corresponds to 'Red' on PE3. Those that are skilled in the art will recognize that route table 400 is merely an example of a data structure that could be used to maintain this information, and the present disclosure is not limited to this embodiment. Similarly, the PE can store the route information on different memory devices such as RAM, ROM, Flash, TCAM, etc.

After step 306, the method continues to step 308 where it receives a message from a neighboring PE device indicating that a port failure has occurred. This message can correspond to a message sent by a PE executing method 200 discussed above at step 210. Accordingly, the message can be colored with a unique port identifier that corresponds to the failed port such as a MAC address of an NNI port. The PE device can receive the message and decompose it to extract the appropriate "color" in order to properly index its locally stored route list or table.

The method continues to step 310 where the PE sorts the locally stored route table/list to identify each vES that is associated with the port failure. After identifying all of the affected vESs, the method can continue to step 312 where the PE can initiate a mass-withdraw and invalidate (e.g. flush, withdraw, delete, remove) all affected routes that are associated with the port (i.e. color) identified in the message. For example, if the received port failure message was colored as 'Blue' coming from PE1, then the local PE device would immediately invalidate the routing entries associated with the impacted vESs: 'A,' 'B,' and 'ZZ'.

The method continues to step 314 where the PE device determines if it is participating in any of the affected vESs. That is, the PE can determine if any of the affected Virtual Ethernet Segments is associated with a local port. Returning to FIG. 1, if PE1 104 informs PE2 106 of a failure at NNI 104*a*, then PE2 106 can determine that both vES 118 and vES 120 are affected by the port failure and are associated with a local port that is a non-designated forwarder for each affected vES. In response, the method can proceed to step 316 where a designated forwarder election process is initiated for the affected vESs. The affected vESs may be configured in single-active redundancy mode in which the failed port was the designated forwarder. The PE device that is elected as a new designated forwarder for a given EVPN instance will unblock traffic for that EVPN instance.

If the PE is not participating in any of the affected vESs, the method continues to step 316 where the PE device resumes previous processing, which includes repeating method 300.

The 'coloring' of routes discussed in the example methods described above with respect to FIGS. 2 and 3 is used as a non-limiting example for explanation purposes. Other attributes, associations, tags, labeling mechanisms, identification mechanisms, mapping mechanisms are also contemplated herein. For example, routes can be marked with specific symbols or characters to uniquely identify an associated NNI port on a PE device.

Example Devices

FIG. 5 illustrates an example network device 510 suitable for high availability and failover. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing or forwarding functions. The CPU 562 can accomplish all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of network device 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the network device 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 617 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 637, module 7 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 670, and hybrids thereof.

The storage device 630 can include software modules 637, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
receiving, at a first provider edge (PE) device, a mass withdrawal message to remove all affected routes associated with a port identifier for an interface of a second PE device;
identifying, by sorting a table that maps one or more virtual ethernet segments to a corresponding port identifier for the interface of the second PE device, a plurality of affected virtual Ethernet segments associated with the port identifier for the interface of the second PE device; and
removing, at the first PE device, any routes associated with at least one of the plurality of affected virtual Ethernet segments.

2. The method of claim 1, wherein the port identifier includes a media access control (MAC) address of the interface acting as network to network interface (NNI).

3. The method of claim 1, wherein the port identifier includes a color or a tag applied by the first PE device, the second PE device, or another PE device.

4. The method of claim 2, wherein the table includes a plurality of virtual Ethernet segments associated with the MAC address.

5. The method of claim 1, further comprising configuring, when a port associated with the at least one of the plurality of affected virtual Ethernet segments is a non-designated forwarder, the port to be a designated forwarder.

6. The method of claim 5, further comprising initiating, when the at least one of the plurality of affected virtual Ethernet segments is associated with a port on the first PE device, a designated forwarder election process.

7. The method of claim 1, wherein the at least one of the plurality of affected virtual Ethernet segments is associated with at least one of a multi-homed customer edge (CE) device or a multi-homed network.

8. A system, comprising:
a processor; and
a computer-readable storage medium having stored therein instructions which, when executed by the processor, cause the processor to perform operations comprising:
receiving, at a first provider edge (PE) device, a mass withdrawal message to remove all affected routes associated with a port identifier for an interface of a second PE device;
identifying, by sorting a table that maps one or more virtual ethernet segments to a corresponding port identifier for the interface of the second PE device, a plurality of affected virtual Ethernet segments associated with the port identifier for the interface of the second PE device; and
removing, at the first PE device, any routes associated with at least one of the plurality of affected virtual Ethernet segments.

9. The system of claim 8, wherein the port identifier includes a media access control (MAC) address of the interface acting as network to network interface (NNI).

10. The system of claim 8, wherein the port identifier includes a color or a tag applied by the first PE device, the second PE device, or another PE device.

11. The system of claim 9, wherein the table includes a plurality of virtual Ethernet segments associated with the MAC address.

12. The system of claim 8, the operations further comprising configuring, when a port associated with the at least one of the plurality of affected virtual Ethernet segments is a non-designated forwarder, the port to be a designated forwarder.

13. The system of claim 12, the operations further comprising initiating, when the at least one of the plurality of affected virtual Ethernet segments is associated with a port on the first PE device, a designated forwarder election process.

14. The system of claim 8, wherein the at least one of the plurality of affected virtual Ethernet segment is associated with at least one of a multi-homed customer edge (CE) device or a multi-homed network.

15. A non-transitory computer-readable storage media having stored therein instructions which, when executed by a processor, cause the processor to perform operations comprising:
receiving, at a first provider edge (PE) device, a mass withdrawal message to remove all affected routes associated with a port identifier for an interface of a second PE device;
identifying, by sorting a table that maps one or more virtual ethernet segments to a corresponding port identifier for the interface of the second PE device, a plurality of affected virtual Ethernet segments associated with the port identifier for the interface of the second PE device; and
removing, at the first PE device, any routes associated with at least one of the plurality of affected virtual Ethernet segments.

16. The non-transitory computer-readable storage media of claim 15, wherein the port identifier includes a media access control (MAC) address of the interface acting as network to network interface (NNI).

17. The non-transitory computer-readable storage media of claim 15, wherein the port identifier includes a color or a tag applied by the first PE device, the second PE device, or another PE device.

18. The non-transitory computer-readable storage media of claim 16, wherein the table includes a plurality of virtual Ethernet segments associated with the MAC address.

19. The non-transitory computer-readable storage media of claim 15, the operations further comprising configuring, when a port associated with at least one of the plurality of the affected virtual Ethernet segments is a non-designated forwarder, the port to be a designated forwarder.

20. The non-transitory computer-readable storage media of claim 19, the operations further comprising initiating, when the at least one of the plurality of affected virtual Ethernet segments is associated with a port on the first PE device, a designated forwarder election process.

* * * * *